United States Patent
Huda

(10) Patent No.: US 7,945,634 B1
(45) Date of Patent: May 17, 2011

(54) METHOD TO CONVERT AND SHARE SHORT MESSAGE SERVICE MESSAGES ON WEBSITES

(75) Inventor: Naushad Huda, Irvine, CA (US)

(73) Assignee: Textopoly, Costa Mesa, CA (US)

( * ) Notice: Subject to any disclaimer, the term of this patent is extended or adjusted under 35 U.S.C. 154(b) by 0 days.

(21) Appl. No.: 12/951,028

(22) Filed: Nov. 20, 2010

Related U.S. Application Data

(60) Provisional application No. 61/263,341, filed on Nov. 20, 2009.

(51) Int. Cl.
G06F 15/16 (2006.01)
(52) U.S. Cl. .................................... 709/206
(58) Field of Classification Search ............ 709/206
See application file for complete search history.

(56) References Cited

U.S. PATENT DOCUMENTS

| | | | |
|---|---|---|---|
| 7,113,801 B2 | 2/2003 | Back et al. | |
| 6,842,612 B2 | 1/2005 | Kalish et al. | |
| 7,024,209 B1 | 4/2006 | Gress et al. | |
| 7,698,347 B2 | 2/2007 | Sagar | |
| 7,698,269 B2 | 6/2007 | Zhou et al. | |
| 7,302,254 B2 | 11/2007 | Valloppillil | |
| 7,512,420 B2 | 7/2008 | Lichtenfeld | |
| 7,697,945 B2 | 9/2009 | Franklin | |
| 2005/0064852 A1 | 3/2005 | Baldursson | |
| 2005/0226166 A1 | 10/2005 | Agrawal et al. | |
| 2006/0094454 A1 | 5/2006 | Kim | |
| 2008/0057988 A1 | 3/2008 | Lovell, Jr. | |
| 2008/0120183 A1 | 5/2008 | Park | |
| 2008/0133678 A1* | 6/2008 | Woodham et al. | 709/206 |
| 2008/0182563 A1 | 7/2008 | Wugofski et al. | |
| 2008/0256170 A1* | 10/2008 | Hayashi et al. | 709/201 |
| 2009/0234876 A1 | 10/2009 | Schigel et al. | |
| 2009/0264140 A1* | 10/2009 | Bain | 455/466 |
| 2010/0004980 A1 | 1/2010 | Bowen | |
| 2010/0257239 A1* | 10/2010 | Roberts | 709/204 |
| 2010/0268659 A1* | 10/2010 | Zimberoff et al. | 705/336 |
| 2010/0293032 A1* | 11/2010 | Engelsma et al. | 705/10 |
| 2010/0312842 A1* | 12/2010 | Ladouceur et al. | 709/206 |
| 2010/0318619 A1* | 12/2010 | Meijer | 709/206 |
| 2011/0022669 A1* | 1/2011 | Pascoe et al. | 709/206 |

FOREIGN PATENT DOCUMENTS

WO WO2008/134622 11/2008

* cited by examiner

*Primary Examiner* — J Bret Dennison
(74) *Attorney, Agent, or Firm* — David Humphrey

(57) ABSTRACT

The present invention relates to a computer program product and method of use thereof that converts short message service (SMS) message content, including but not limited to, text messages, photos, web links to articles, and advertisements, so that the content can be posted on websites.

9 Claims, 2 Drawing Sheets

METHOD TO CONVERT AND SHARE SHORT MESSAGE SERVICE MESSAGES ON WEBSITES

This application claims the benefit of U.S. Provisional Application 61/263,341 filed on Nov. 20, 2009, which is hereby incorporated by reference in its entirety.

FIELD OF THE INVENTION

The present invention relates to a computer software program, message and methods of converting text and/or content from an SMS message received by one user, so that the SMS message may shared and posted on websites such as social media websites.

BACKGROUND

The wide-spread use of cellular phones and increased user demand for Internet access has resulted in manufacturers producing new generations of cellular phones that have improved service and novel software applications. The latest cellular phone models and other wireless devices are equipped with Internet browser software (often called "microbrowsers") that enables users to access media content on the Internet. Many earlier generation cellular phones do not contain microbrowsers or the cellular phone user does not want to pay additional monthly subscription fees required so that their wireless device or cellular phone has access to Internet media content. However, limited Internet access can be provided to wireless devices with and without microbrowsers using a service known as Short Message Service ("SMS").

SMS is a subscriber service that operates in similar fashion to a pager service. Unlike paging, SMS does not require that the wireless device be active and within range when the message is sent. If a wireless device is either inactive or out of range, the SMS message generally is held for a period of time until the wireless device either returns to active status or is within range. Using SMS, a mobile device may send and receive short text messages without establishing a voice circuit connection. These short messages are typically limited to 160 alphanumeric characters. The cellular phone user sends a short "keyword" text message to a short code address (usually a 5- or 6-digit number). A server matches the keyword message and prepares an SMS message that includes the information requested and sends it back to the requesting wireless device. For example, a user may want to have the latest basketball scores sent directly to his/her cellular phone. A service may exist that sends the latest basketball scores to wireless devices. In this example, in order to sign up for the service, the user must text the word "Scores" to 555233. The server matches the keyword and sends an SMS message back to the requesting mobile phone that contains the latest basketball scores.

Person-to-person text messaging is the most commonly used application and it is what the SMS technology was originally designed for. In these kinds of text messaging applications, a mobile user types an SMS text message using the keypad of his/her mobile phone, then he/she inputs the mobile phone number of the recipient and clicks a certain option on the screen, such as "Send" or "OK", to send the text message. When the recipient mobile phone receives the SMS text message, it will notify the user by giving out a sound or vibrating. The user can read the SMS text message some time later or immediately and can send a text message back if he/she wants. In the above example, both the sender and the recipient are using mobile devices. However, applications and software exist so that SMS messages may be sent and or received using a computer/PC.

In addition to person-to-person text messaging, SMS services can be utilized to send multi-media content, pictures, ring tones, etc. A relatively recent application of SMS services is wireless advertising, sometimes referred to as "mobile marketing." As wireless devices have become increasingly prevalent, marketers have discovered that SMS services provide the opportunity to reach an enormous audience via SMS messaging. In particular, mobile marketers have used SMS services to deliver SMS ads, service reminders, "mobile coupons" and special announcements. In addition, using two-way SMS messaging, mobile marketers have used SMS services to conduct contests, surveys, trivia games, and e-commerce transactions with recipients.

Sending SMS content from one mobile phone to another mobile phone is only one of the ways SMS is utilized. There are also web-based mobile SMS-services, commonly known as "Web-2-SMS". A user logs on to a web site (such as Group2call.com, GizmoSMS.com, ClearSMS.com, Swaggle.com, etc) and sends a text message to a recipient. The web interface essentially consists of a database and a connection to an SMS Gateway. The SMS Gateway can convert complicated SMS protocols such as SMPP and CIMD into more common protocols such as HTTP/HTTPS. The text message is then delivered to an SMS Center (SMSC) which delivers the message to the recipient's mobile phone.

One of the limitations of current SMS messaging using mobile or cellular phones is that it is difficult for a recipient of SMS message content such as advertisements, text messages, pictures, etc. to share the content on social media sites, such as Facebook® and Twitter®.

SUMMARY

The present invention relates to a computer software product and a method of converting SMS message content received by a user's cellular phone so that it can be posted and/or shared on websites. In certain embodiments, the websites to which the information is shared are social media websites such as Facebook® and Twitter®. Using the computer software product and the methods describe herein, the recipient of an SMS message can easily share the content on his/her account on social media sites. For example, the recipient has received an SMS message on his/her mobile phone containing an electronic coupon for 20% off the total price of his/her next purchase. The recipient can post the coupon on his personal account on a social media site so that friends may also share in the savings. The computer software product and methods of thereof allows the recipient to automatically forward the content to his/her Facebook® or Twitter® accounts, for example.

In some embodiments, the user is accessing social networking sites, such as Facebook® through a mobile device.

DETAILED DESCRIPTION

Figure 1:
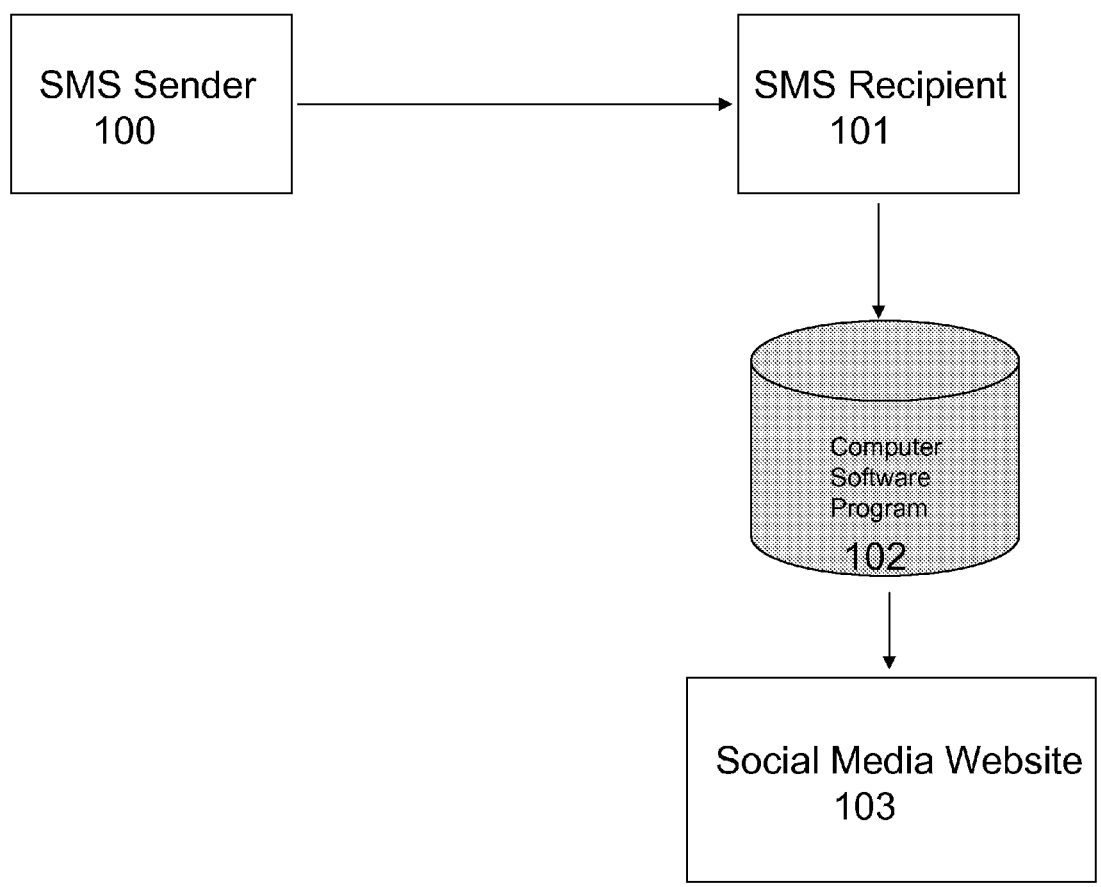
FIG. 1 is a schematic representation using a flow diagram demonstrating usage of the computer software application and methods of converting SMS message content so that it may be shared on websites such as social media sites.

The present invention relates to a computer program product, and method of converting SMS text messages and other SMS content so that the content may be shared on websites including, but not limited to, social media websites.

An end user will receive a SMS message containing a shortened URL. Once the end user clicks on the shortened URL, they will be redirected to an intermediary webpage containing the computer program product. The computer program product is hosted on a single server. The computer program product holds 3 items of information: 1) meta data, 2) a redirect script, and 3) analytics code. The meta data contains the SMS message that will be posted as a link to the end user's page on a social media website such as Facebook®. The redirect script is written in Javascript and/or PHP, and the analytic code. When the end users click on the intermediary webpage link directly (the shortened URL), it will direct them to the intermediary page and then redirect them to the Facebook® login page. Once an end user logs into Facebook®, Facebook® will redirect them and pass the URL of the intermediary page to its share link API. The Facebook® share link API page will import the meta data from computer program product intermediary page and will post it to the Facebook® share API, allowing the end user to click share and have the link posted to their wall. If the end user or any of his/her friends then clicks the link to the intermediary page from Facebook®, they will be directed to the intermediary page of the instant invention. If the computer program product determines an end user is coming from Facebook® it will redirect them to "clients" homepage such as a vendor supplying specific advertisement or coupon, thus never allowing the end user to end on the intermediary site. The intermediary page is never viewed by the end user but only used as a redirect page.

Methods of generating shortened URLs are known in the art. The methods described in the art utilize the shortened URL for the sole purpose of accessing another resource that is associated with a full identifier, such as a full URL. However, unlike previous inventions and methods of obtaining shortened URLs, the computer product and method of the instant invention generates a shortened URL that associates information such as the SMS message content with the shortened URL. In this way, when another user clicks on the shared link, that user will not only be directed to the full URL but will see the SMS content as well. The computer program product will work for all SMS text messages and visual content as well. Photos and wallpaper may also be shared using the instant invention by setting up the image meta information. Sub-links could also be passed through.

The computer program product must access a secure and proprietary database that contains the registered user's account information. The user account information may contain, but is not limited to, the user's program identification number, user's cellular/mobile phone number, Facebook® and/or other social media identification numbers that may be used to access the computer program product.

The term "advertisement" or "advertisements" in the instant invention may refer to traditional advertisements giving the user information about a specific product or sale, as well as special product or service offers, promotional deals, instant rebates, coupons, and discounts. "Advertisement" may also include notifications and alerts about special events, sales, or limited time offers. "Advertisement" may further include gift cards, frequent shopper rewards, etc. for goods and services. "Advertisement" may further include digital goods such as wallpapers, video, ringtones, and digital flowers.

The computer program product and application allow the user to forward, and save SMS content on a website as opposed to leaving the content solely on the mobile phone. For example, the user may archive old text messages, forward incoming messages or archived messages, search all text messages based on message content, sender, recipient, time and date. The invention also can take advantage of the unlimited data plans provided by many wireless providers to avoid potential charges and fees associated with users exceeding the allotted number of text messages (or charges per text message).

In addition to providing benefits to individual users, the computer program product will also benefit company advertisers. Since the recipient desires to share the advertisement and/or SMS content with friends via social media websites, the recipient must have found the advertisement relevant and useful. Friend-based advertisement sharing will generate new sources of revenue from population demographics that would not respond to traditional media advertising such as television and newspaper advertisements.

Referring to the drawing, FIG. 1 illustrates via a flow diagram in which one mobile phone user, the sender, 100, sends an SMS text messages or other content to another mobile phone user, the recipient, 101. The recipient decides that he/she would like to share the content of the SMS message with his/her friends on a social networking/media website, 103, such as Facebook®. The recipient utilizes the computer software program, 102, and the methods used therein to convert the SMS message and automatically share the content on the recipient's social media website account, 103.

Figure 2:
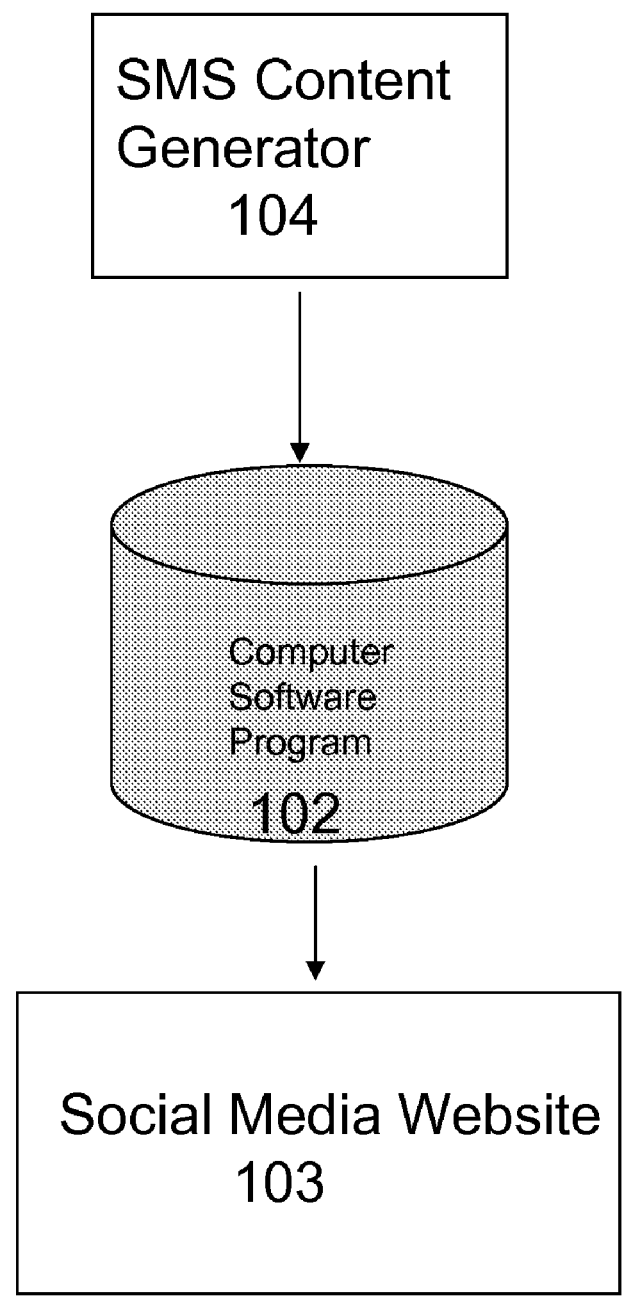
FIG. 2 is a schematic representation using a flow diagram demonstrating usage of the computer software application and methods of converting SMS message content wherein the user generates/saves the content using SMS, converts the content using the computer software program, and shares the SMS content with others using his/her account on websites such as social media sites.

FIG. 2 is a flow diagram illustrating another situation when user, 104, is creating an SMS message using his/her mobile phone and wants to post the message on user's own social media website account, 103. The content creator, 104 utilizes the computer software program, 102, and the methods used therein to convert the SMS message and automatically share the content on the recipient's social media website account, 103. In this situation, the content generator, 104, in addition to posting the SMS message on his/her social media website account, can send selected individual people SMS messages to their mobile phones using traditional person-to-person messaging.

In one example, the user opts into an SMS campaign either by: 1) sending a keyword to short code on the mobile phone or 2) entering their mobile phone number on a website/mobile website. The computer software program, 102, sends the user SMS content to the user's mobile phone. In addition to the text of the message such as "Get a free $10 gift card from Larry's Pizza" a shortened URL, unique to this particular user, is included in the message with the option of sharing the SMS content on a social network or other website. If the user clicks on the shortened URL, the computer software program, 102, posts the SMS content on the user's social media website or other website. The SMS content may be either the same as the user originally received, such as "Get a free gift card" as in the scenario above or the content may be different. For example, the SMS content shared on the website may be a special offer such as "Get a large pizza at Larry's Pizza for $10" with either a shortened URL or a full URL. If one of the user's friends or other user viewing the particular website is interested in the SMS content or offer, selecting the link on the user's shared SMS content, the friend or other user is directed to the advertiser's website, in this case Larry's Pizza.

It will be apparent to those skilled in the art that some modifications and variations of the present invention can be made without departing form the spirit and scope of the invention. Thus, it is intended that the present invention cover the modifications and variations of this invention provided they come within the scope of the claims and their equivalents.

What is claimed is:

1. A method for sharing or uploading SMS media content on a social networking or other website, the method comprising:
    creating the text for an SMS message;
    identifying a destination website where the user may be re-directed;
    creating a unique, shortened URL using a computer software product;
    inserting said shortened URL into said SMS message;
    sending said SMS message to a user;
    wherein said user receives said message and clicks on said shortened URL in order to share SMS media content; and
    wherein said computer software product direct sing the user to an intermediary website created by the computer software product, which posts SMS media content from the SMS message to the user's page on a social media website and directs the user to the destination website.

2. The method of claim 1 wherein the computer software product comprises meta data, re-direct script, and analytics code.

3. The method of claim 1 wherein the user receives SMS content from another user comprising an individual or advertiser.

4. The method of claim 1 wherein the SMS media content comprises a text message.

5. The method of claim 1 wherein the SMS media content comprises a photographic image.

6. The method of claim 1 wherein the SMS media content comprises an audio file.

7. The method of claim 1 wherein the SMS media content comprises a video file.

8. The method of claim 1 wherein the intermediary website is not seen by the user.

9. A non-transitory computer-readable medium having stored thereon computer-readable instructions, which when executed by a machine, cause the machine to perform operations comprising:
    creating the text for an SMS message;
    identifying a destination website where the user may be re-directed;
    creating a unique, shortened URL using a computer software product;
    inserting said shortened URL into said SMS message;
    sending said SMS message to a user;
    wherein said user receives said message and clicks on said shortened URL in order to share SMS media content; and
    wherein said computer software product direct sing the user to an intermediary website created by the computer software product, which posts SMS media content from the SMS message to the user's page on a social media website and directs the user to the destination website.

* * * * *